US011092193B2

(12) United States Patent
Matsunaga et al.

(10) Patent No.: US 11,092,193 B2
(45) Date of Patent: Aug. 17, 2021

(54) BALL BEARING, AND MACHINE TOOL SPINDLE DEVICE

(71) Applicant: NSK LTD., Tokyo (JP)

(72) Inventors: Kyohei Matsunaga, Fujisawa (JP); Yoshiaki Katsuno, Fujisawa (JP)

(73) Assignee: NSK LTD., Tokyo (JP)

( * ) Notice: Subject to any disclaimer, the term of this patent is extended or adjusted under 35 U.S.C. 154(b) by 336 days.

(21) Appl. No.: 16/325,450

(22) PCT Filed: Aug. 10, 2017

(86) PCT No.: PCT/JP2017/029165
§ 371 (c)(1),
(2) Date: Feb. 14, 2019

(87) PCT Pub. No.: WO2018/034246
PCT Pub. Date: Feb. 22, 2018

(65) Prior Publication Data
US 2021/0148400 A1 May 20, 2021

(30) Foreign Application Priority Data
Aug. 15, 2016 (JP) .............................. JP2016-159262

(51) Int. Cl.
F16C 19/16 (2006.01)
F16C 19/18 (2006.01)
(Continued)

(52) U.S. Cl.
CPC .......... F16C 19/163 (2013.01); B23Q 11/123 (2013.01); F16C 19/181 (2013.01);
(Continued)

(58) Field of Classification Search
CPC ...... F16C 19/163; F16C 19/181; F16C 19/28; F16C 19/547; F16C 19/583;
(Continued)

(56) References Cited

U.S. PATENT DOCUMENTS 6,105,724 A * 8/2000 Stitz ...................... F16C 33/583
184/7.4
6,176,349 B1 * 1/2001 Kishi .................... F16C 19/163
184/55.1
(Continued)

FOREIGN PATENT DOCUMENTS

CN 1671973 A 9/2005
CN 202545564 U 11/2012
(Continued)

OTHER PUBLICATIONS

Search Report dated Nov. 14, 2017, issued by the International Searching Authority in counterpart International Patent Application No. PCT/JP2017/029165 (PCT/ISA/210).
(Continued)

Primary Examiner — Marcus Charles
(74) Attorney, Agent, or Firm — Sughrue Mion, PLLC

(57) ABSTRACT

In an angular ball bearing (10), an outer race (12) has at least one diameter-directional hole (15) that supplies lubricating oil and passes through from the outer circumferential surface to the inner circumferential surface along the diameter direction. In a cross-section taken along the axial direction passing through a center (O) of the ball (13), the axial-directional position of a line extending through a central axis (X) of the diameter-directional hole (15) in the outer circumferential surface of a retainer (14) is located between an intersection position (A), at which an outer circumferential surface (14a) of the retainer (14) and a surface of a ball (13) intersect, and an axial-directional end (B) of a pocket (P).

10 Claims, 6 Drawing Sheets

(51) Int. Cl.
*F16C 33/66* (2006.01)
*F16N 7/32* (2006.01)
*B23Q 11/12* (2006.01)
*F16C 19/54* (2006.01)

(52) U.S. Cl.
CPC ........ *F16C 19/547* (2013.01); *F16C 33/6659* (2013.01); *F16C 33/6662* (2013.01); *F16N 7/32* (2013.01); *F16C 2322/39* (2013.01)

(58) Field of Classification Search
CPC .............. F16C 33/6659; F16C 33/7896; F16C 2322/39; B23Q 11/123
USPC .......................... 384/466, 468, 475, 477, 504
See application file for complete search history.

(56) References Cited

U.S. PATENT DOCUMENTS

| | | | | |
|---|---|---|---|---|
| 8,403,110 B2* | 3/2013 | Suzuki | ................. | F16C 19/546 |
| | | | | 184/6.26 |
| 8,753,016 B2* | 6/2014 | Matsuyama | ........ | F16C 33/6625 |
| | | | | 384/471 |
| 8,956,050 B2* | 2/2015 | Kosugi | ................ | F16C 19/163 |
| | | | | 384/475 |
| 2003/0113048 A1* | 6/2003 | Azumi | .................... | B23Q 1/70 |
| | | | | 384/475 |
| 2006/0171622 A1 | 8/2006 | Ohata et al. | | |
| 2013/0004107 A1 | 1/2013 | Okamoto et al. | | |
| 2013/0202237 A1 | 8/2013 | Kosugi | | |
| 2018/0023621 A1 | 1/2018 | Matsunaga et al. | | |
| 2019/0170187 A1* | 6/2019 | Matsunaga | ........... | F16C 19/181 |

FOREIGN PATENT DOCUMENTS

| | | | | |
|---|---|---|---|---|
| DE | 102007034023 A1 | 1/2009 | | |
| DE | 102012222626 A1 | 6/2014 | | |
| DE | 102014212620 A1 | 12/2015 | | |
| JP | 63-180726 U | 11/1988 | | |
| JP | 2009185979 A * | 8/2009 | ............. | F16C 33/66 |
| JP | 2013-79711 A | 5/2013 | | |
| JP | 2016-516969 A | 6/2016 | | |
| JP | 2016-142393 A | 8/2016 | | |

OTHER PUBLICATIONS

Written Opinion dated Nov. 14, 2017, issued by the International Searching Authority in counterpart International Patent Application No. PCT/JP2017/029165 (PCT/ISA/237).

Communication dated Jan. 7, 2020, from the Japanese Patent Office in counterpart application No. 2016-159262.

Communication dated Nov. 28, 2019 issued by the State Intellectual Property Office of P.R. China in counterpart Chinese Application No. 201780050087.5.

* cited by examiner

BALL BEARING, AND MACHINE TOOL SPINDLE DEVICE

CROSS REFERENCE TO RELATED APPLICATIONS

This application is a National Stage of International Application No. PCT/JP2017/029165 filed Aug. 10, 2017, claiming priority based on Japanese Patent Application No. 2016-159262 filed Aug. 15, 2016.

TECHNICAL FIELD

The present invention relates to a ball bearing, and a spindle device for machine tool, and more specifically, to an outer ring oil supply-type ball bearing, and a spindle device for machine tool.

RELATED ART

In recent years, demands for a high speed spindle for machine tool increase so as to improve cutting efficiency. Also, recently, needs to apply the spindle to a multi-axis processing machine capable of processing a member to be processed having a complex shape without using a plurality of machine tools and without set-up change increase so as to increase production efficiency. For example, as shown in FIG. 6, in a double column type machining center 200 that is an example of the multi-axis processing machine, a table 203 is supported to be moveable in an X-axis direction on a bed 202, and a pair of columns 204 is provided at both sides of the bed 202, A cross rail 205 is bridged on upper ends of the columns 204, and a saddle 206 is provided to the cross rail 205 so as to be moveable in a Y-axis direction. A spindle for machine tool 210 is held at a spindle head 208 mounted to a lower end of a ram 207 so that it can be driven in a rotary indexing manner around the Y-axis and Z-axis.

In the multi-axis processing machine, since the spindle rotates, it is required to shorten an axial length of the spindle because of needs such as space saving by shortening of a radius of rotation or power saving by reduction in inertia upon rotation or weight saving.

Also, as a lubrication method that is adopted for a rolling bearing (refer to FIG. 9) of the spindle for machine tool, grease lubrication, oil/air lubrication, oil/mist lubrication and the like may be exemplified. In general, the oil/air lubrication is adopted in a region of high-speed rotation (dmn value: 800,000 or higher). As the oil/air lubrication of the related art, a type where high-pressure air and fine oil particles are supplied from a bearing side surface into a bearing by using a nozzle piece for oil supply 101 arranged at a side of a bearing 100 shown in FIG. 7A or a nozzle piece for oil supply 101 inserted in a radial through-hole 102a of an outer ring spacer 102 arranged at a side of a bearing 100 shown in FIG. 7B has been known.

In the above type, it is necessary to separately provide the component for oil supply such as the nozzle piece 101, so that the number of components of the spindle increases. Accordingly, the cost of the spindle increases as a whole and labor for management also increases. Also, since the nozzle piece 101 is used, a shape of an outer ring spacer and a structure of a housing are complicated, so that labor for design/processing of the spindle increases. Also, since the nozzle piece 101 is provided to a side surface of the bearing in a direction of a rotary shaft, a spacer length is required to some extent, so that an axial length of the spindle increases. Thereby, a size of the machine tool increases, a weight of the spindle increases by the increased axial length, and a critical speed (The critical speed means a rotating speed calculated from an eigen frequency of the spindle. When the spindle is rotated in a region of the critical speed, the vibration largely increases.) of the spindle is lowered. Also, by an air curtain generated in association with the high-speed rotation (the air curtain means a wall of a circumferential high-speed air stream generated due to friction between the air and an outer-diameter surface of an inner ring being rotating at high speed), the supply of oil particles from the nozzle for oil supply is disturbed, so that the lubricating oil is difficult to be securely supplied into the bearing. Like this, the oil/air lubrication of the related art has higher lubricity under high-speed rotation than the grease lubrication. However, as the speed increases, it is important to cope with the speed-up.

Also, as the other oil/air lubrication type, as shown in FIG. 8, an outer ring oil supply-type bearing 110 where a circumferential oil groove 112 is formed in an outer peripheral surface of an outer ring 111 and a radial oil hole 113 is formed at the same axial position as the oil groove 112 is used (for example, refer to Patent Document 1). In the outer ring oil supply-type bearing, even when the bearing is used for high-speed rotation, the supply of oil particles is not disturbed by the air curtain. For this reason, it is possible to stably use the spindle even at the high-speed rotation.

FIG. 9 is a schematic view of spindles in each of cases where the oil/air lubrication using the nozzle piece 101 is performed and the oil/air lubrication of an outer ring oil supply specification is performed. In FIG. 9, the upper half shows a spindle 120 where the oil/air lubrication of the outer ring oil supply specification is performed, and the lower half shows a spindle 120A where the oil/air lubrication using the nozzle piece 101 is performed. Meanwhile, in FIG. 9, a reference numeral 121 indicates a rotary shaft, a reference numeral 122 indicates a rotor of a motor to be fitted to the rotary shaft 121, a reference numeral 124 indicates a housing, and a reference numeral 125 indicates an oil supply path formed in the housing 124. Like this, in the case of the oil/air lubrication using the nozzle piece 101, a spacer having a predetermined axial length or longer is required so as to supply the lubricating oil from a side surface of the bearing 100. In contrast, in the case of the outer ring oil supply specification, it is not necessary to provide a spacer for oil supply, so that it is possible to omit the nozzle piece, to simplify the structure of the spacer, and to shorten the axial length of the spacer 123, as compared to the case where the nozzle piece is used. Thereby, in the case of the outer ring oil supply specification, it is possible to simply design and process the spindle and the component for oil supply, to easily manage the components, and to reduce the entire cost relating to the design/manufacturing/management of the machine tool. In addition, it is possible to shorten the axial length, so that it is possible to reduce the size of the machine tool and to improve the critical speed of the spindle. Like this, the outer ring oil supply-type bearing has many merits, as compared to the side surface oil supply-type bearing of the related art.

CITATION LIST

Patent Documents

Patent Document 1: JP-A-2013-79711

SUMMARY OF INVENTION

Problems to be Solved by Invention

In the outer ring oil supply-type bearing, it is required to design an appropriate supply position so as to directly supply the lubricating oil to a rolling element, i.e., to directly supply the lubricating oil to the vicinity of a contact part between the rolling element and the inner and outer rings. For example, when an inner diameter-side opening of the radial hole of the outer ring overlaps a contact ellipse of a contact part between an outer ring raceway groove and a ball, a contact surface pressure between the outer ring raceway groove and the ball increases in the vicinity of an edge of the opening, so that a damage such as early seizure may be caused at the bearing.

Also, as shown in FIG. 8, even when the inner diameter-side opening of the oil hole 113 of the outer ring 111 does not overlap the contact ellipse and is not provided on an outer ring raceway groove 111a, if the inner diameter-side opening is provided in the vicinity of the outer ring raceway groove, the lubricating oil is directly attached to a ball 114 and the lubricating oil is supplied to the vicinity of the contact ellipse at one time by rotation of the ball 114, so that a damage may be caused due to the high heat generation of the bearing.

The present invention has been made in view of the above situations, and an object thereof is to provide a ball bearing, and a spindle device for machine tool capable of preventing a damage of the bearing due to poor lubrication and abnormal heat generation and keeping stable rotation characteristics at high speed by appropriately setting an axial position of a radial hole provided in an outer ring of an outer ring oil supply-type bearing.

Means for Solving Problems

The object of the present invention is accomplished by following configurations.

(1) A ball bearing including:
an inner ring having an inner ring raceway groove formed in an outer peripheral surface;
an outer ring having an outer ring raceway groove formed in an inner peripheral surface;
a plurality of balls arranged rollably between the inner ring raceway groove and the outer ring raceway groove; and
a cage having pockets configured to keep therein the plurality of balls,
wherein the outer ring has at least one radial hole which penetrates from an outer peripheral surface thereof to the inner peripheral surface thereof in a radial direction and which is configured to supply lubricating oil,
wherein the ball bearing is lubricated by the lubricating oil, and
wherein an axial position of an extension line of a central line of the radial hole on an outer peripheral surface of the cage is located between an intersection position, at which the outer peripheral surface of the cage and a surface of the ball intersect, and an axial end portion of the pocket, in a section taken along an axial direction passing through a center of the ball.

(2) The ball bearing according to the above (1),
wherein at least a part of an inner diameter-side opening of the radial hole is provided on a groove shoulder formed on the inner peripheral surface of the outer ring.

(3) The ball bearing according to the above (1),
wherein at least a part of an inner diameter-side opening of the radial hole is provided on a counterbore formed on the inner peripheral surface of the outer ring, (4) The ball bearing according to one of the above (1) to (3),
wherein the pocket of the cage has a circular cylinder shape.

(5) The ball bearing according to one of the above (1) to (4),
wherein the outer peripheral surface of the outer ring is formed with a concave groove which is configured to communicate with the radial hole and which is formed along a circumferential direction.

(6) The ball bearing according to the above (5),
wherein the outer peripheral surface of the outer ring is formed with annular grooves which are formed at both axial sides of the concave groove being interposed therebetween and which are formed along the circumferential direction, and
wherein an annular seal member is arranged in each of the annular grooves.

(7) The ball bearing according to one of the above (1) to (6),
wherein a diameter of the radial hole is 0.5 to 1.5 mm.

(8) A spindle device for machine tool including the ball bearing according to any one of the above (1) to (7).

In the specification, the axial position of the extension line of the central line of the radial hole indicates an axial position at which the extension line of the central line of the radial hole is located in a direction of a rotary shaft of the ball bearing. Also, the section taken along the axial direction passing through the center of the ball indicates a section taken along the direction of the rotary shaft of the ball bearing passing through the center of the ball. The axial end portion of the pocket indicates an end portion of the pocket in the direction of the rotary shaft of the ball bearing.

Effects of Invention

According to the ball bearing of the present invention, the outer ring has at least one radial hole penetrating from the outer peripheral surface to the inner peripheral surface in the radial direction and configured to supply the lubricating oil. The axial position of the extension line of the central line of the radial hole on the outer peripheral surface of the cage is located between the intersection position, at which the outer peripheral surface of the cage and the surface of the ball intersect, and the axial end portion of the pocket, in the section taken along the axial direction passing through the center of the ball. Thereby, it is possible to prevent a damage of the bearing, which is caused due to the poor lubrication and abnormal heat generation, and to keep stable rotation characteristics at high speed.

DETAILED DESCRIPTION OF PREFERRED EMBODIMENTS

Hereinafter, a ball bearing and a spindle device for machine tool in accordance with each embodiment of the present invention will be described in detail with reference to the drawings.

First Embodiment

Figure 1:
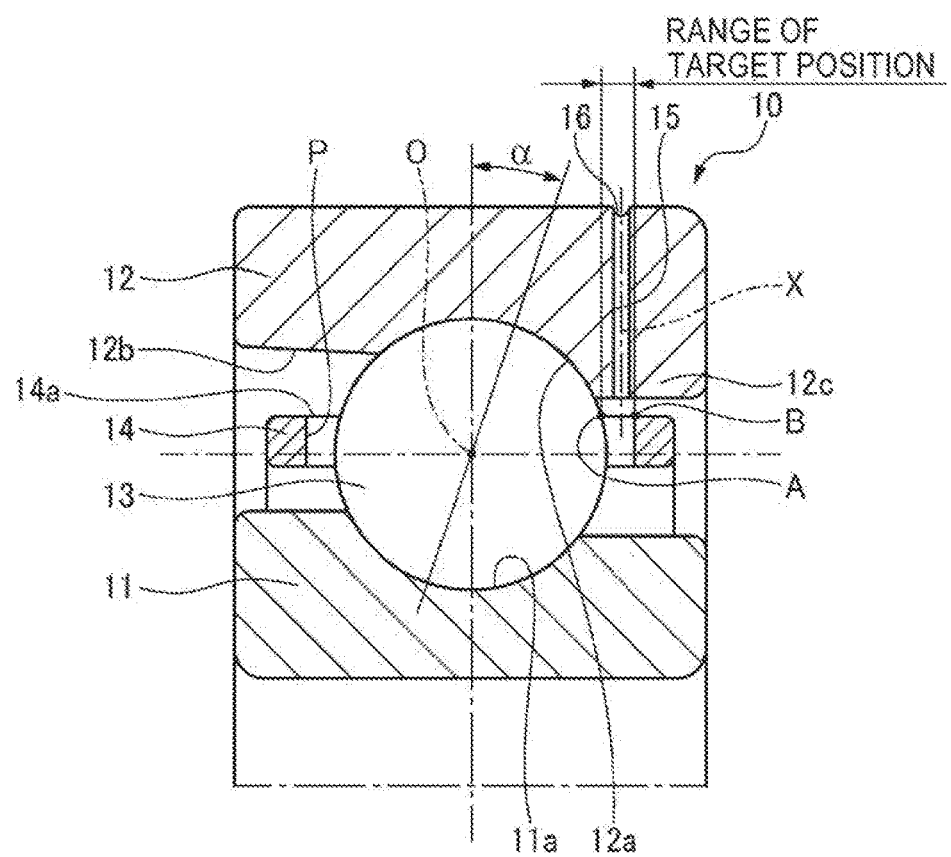
FIG. 1 is a sectional view depicting a ball bearing in accordance with a first embodiment of the present invention, together with a target position of a radial hole.

As shown in FIG. 1, an angular ball bearing 10 in accordance with a first embodiment can be applied to a spindle device for machine tool, and includes an inner ring 11 having a circular arc-shaped inner ring raceway groove 11a formed in an outer peripheral surface, an outer ring 12 having a circular arc-shaped outer ring raceway groove 12a formed in an inner peripheral surface, a plurality of balls 13 each of which has a predetermined contact angle α and is arranged rollably between the inner ring raceway groove 11a and the outer ring raceway groove 12a, and an outer ring guide-type cage 14 having pockets P configured to keep the plurality of balls 13 and having a circular cylinder shape. One axial inner peripheral surface of the outer ring 12 is formed with a counterbore 12b having an inclined part of which a diameter gradually decreases from an axial end face toward the outer ring raceway groove 12a, and the other axial inner peripheral surface is formed with a groove shoulder 12c having a uniform inner diameter. Also, in the first embodiment, an outer peripheral surface 14a of the cage 14 has a uniform outer diameter in an axial direction.

The angular ball bearing 10 is an outer ring oil supply-type bearing, and the outer ring 12 has a radial hole 15 penetrating from the outer peripheral surface to the inner peripheral surface in a radial direction. Also, the outer peripheral surface of the outer ring 12 is formed with a concave groove 16 configured to communicate with the radial hole 15 along a circumferential direction. Thereby, in the angular ball bearing 10, oil particles and lubricating air supplied from an oil supply passage of a housing (not shown) are directly supplied to the ball 13 through the concave groove 16 and the radial hole 15 of the outer ring 12, so that the oil/air lubrication is performed.

Instead of the configuration where the outer ring 12 is formed with the circumferential concave groove, the circumferential concave groove may be formed at a position of an opening of the oil supply passage that is formed in an inner peripheral surface of the housing and is configured to communicate with the radial hole 15.

Also, in the first embodiment, an axial position of an extension line of a central line X of the radial hole 15 on the outer peripheral surface of the cage 14 is within a range between an intersection position A, at which the outer peripheral surface 14a of the cage 14 and a surface of the ball 13 intersect, and an axial end portion B of the pocket P, in a section taken along an axial direction passing through a center O of the ball 13. Also, in the first embodiment, the radial hole 15 is located at an opposite side to the counterbore with respect to the outer ring raceway groove 12a, and at least a part of an inner diameter-side opening of the radial hole 15 is provided on the groove shoulder 12c formed on the inner peripheral surface of the outer ring 12.

Here, the reason of the configuration where the axial position of the extension line of the central line X of the radial hole 15 on the outer peripheral surface of the cage 14 is within the range between the intersection position A and the axial end portion B of the pocket P, in the section taken along an axial direction passing through the center O of the ball 13, is described, as follows.

<<Reason for Configuration where Axial Position of Extension Line of Central Line X of Radial Hole 15 on Outer Peripheral Surface of Cage 14 is Located Closer to Groove Bottom than Axial End Portion B of Pocket P, in Section Taken Along Axial Direction Passing Through Center O of Ball 13>>

If the radial hole 15 is provided in such a way that the axial position of the extension line of the central line X of the radial hole 15 on the outer peripheral surface of the cage 14 is located closer to an opposite side to a groove bottom than the axial end portion B of the pocket P, in the section taken along the axial direction passing through the center O of the ball 13, the lubricating oil supplied from the radial hole 15 is not attached to the ball 13, so that a lubrication defect or a bearing damage due to the lubrication defect may be caused during rotation of the bearing. In addition, the high-pressure air supplied together with the lubricating oil collides with the cage 14, not the ball 13, so that the cage 14 is pushed by the high-pressure air and the cage 14 is thus moved in the radial direction. When this phenomenon occurs repetitively during the rotation of the bearing, the cage 14 abnormally vibrates, so that malfunctions such as cage sound may be generated.

Due to the above reasons, the axial position of the radial hole 15 is preferably designed so that the axial position of the extension line of the central line X of the radial hole 15 on the outer peripheral surface of the cage 14 is located closer to the groove bottom than the axial end portion B of the pocket P.

<<Reason for Configuration where Axial Position of Extension Line of Central Line X of Radial Hole 15 on Outer Peripheral Surface of Cage 14 is Located Closer to Opposite Side to Groove Bottom than Intersection Position A, at which Outer Peripheral Surface 14a of Cage 14 and Surface of Ball 13 Intersect, in Section Taken Along Axial Direction Passing Through Center O of Ball 13>>

If the radial hole 15 is provided in such a way that the axial position of the extension line of the central line X of the radial hole 15 on the outer peripheral surface of the cage 14 is located closer to the groove bottom than the intersection position A, at which the outer peripheral surface 14a of the cage 14 and the surface of the ball 13 intersect, in the section taken along the axial direction passing through the center O of the ball 13, a contact ellipse of a contact part between the ball 13 and the outer ring 12 may overlap the inner diameter-side opening of the radial hole 15, depending on an initial contact angle of the bearing and using conditions thereof (during the rotation of the bearing, the contact angle is changed into a state different from a stationary state due to an influence of the centrifugal force to be applied to the ball, and the like). When the overlapping occurs, a contact surface pressure between the outer ring raceway groove 12a and the ball 13 increases in the vicinity of an edge of the inner diameter-side opening of the radial hole 15, so that a damage such as early seizure is likely to be caused at the bearing. Also, even though the overlapping does not occur, when a distance between the contact ellipse and the inner diameter-side opening is short, the lubricating oil is supplied to the vicinity of the contact ellipse at one time, so that a damage due to the high heat generation of the bearing may be caused.

Due to the above reasons, the radial hole 15 is preferably provided in such a way that the extension line of the central line X of the radial hole 15 is located closer to an opposite side to the groove bottom than the intersection position A, at which the outer peripheral surface 14a of the cage 14 and the surface of the ball 13 intersect, in the section taken along the axial direction passing through the center O of the ball 13. Thereby, it is possible to prevent the contact between the ball 13 and the inner diameter-side opening of the radial hole 15 or the overlapping between the contact ellipse of the ball 13 and the outer ring raceway groove 12a and the inner diameter-side opening of the radial hole 15, so that it is possible to prevent the above-described damage and to improve the assembling operability and handling efficiency.

Also, when the radial hole 15 is located within the range, it is possible to locate the entire inner diameter-side opening of the radial hole 15 at an outer side of the outer ring raceway groove 12a or to locate a part thereof in the vicinity of the opposite side end to the groove bottom of the outer ring raceway groove 12a. Thereby, when forming the race groove, it is not necessary to pay attention to the inner diameter-side opening of the radial hole 15 (for example, burr of the intersection part of an opening surface of the radial hole 15 and the outer ring raceway groove 12a), and workability of the bearing is improved.

Also, when the radial hole 15 is located within the range, the lubricating oil is directly supplied into a space between the ball 13 and an inner-diameter surface of the pocket. Therefore, it is possible to favorably lubricate a slide contact part of high circumferential speed between the ball 13 and the inner surface of the pocket, so that it is possible to keep stable rotation characteristics at high speed.

Meanwhile, in the first embodiment, as shown in FIG. 1, the axial position of the entire inner diameter-side opening of the radial hole 15 is more preferably located between the intersection position A, at which the outer peripheral surface 14a of the cage 14 and the surface of the ball 13 intersect, and the axial end portion B of the pocket P, in the section taken along the axial direction passing through the center O of the ball 13.

Also, in the first embodiment, the diameter of the radial hole 15 is set to 0.5 to 1.5 mm, considering the supply ability of the lubricating oil and the interference prevention with the contact ellipse. Also, in the first embodiment, the radial hole 15 has a uniform diameter in the radial direction.

Therefore, according to the angular ball bearing 10 of the first embodiment, since the axial position of the extension line of the central line X of the radial hole 15 on the outer peripheral surface of the cage 14 is located between the intersection position A, at which the outer peripheral surface 14a of the cage 14 and the surface of the ball 13 intersect, and the axial end portion B of the pocket P, in the section taken along the axial direction passing through the center O of the ball 13, it is possible to prevent a damage of the bearing due to poor lubrication and abnormal heat generation and to keep the stable rotation characteristics at high speed.

Figure 2:
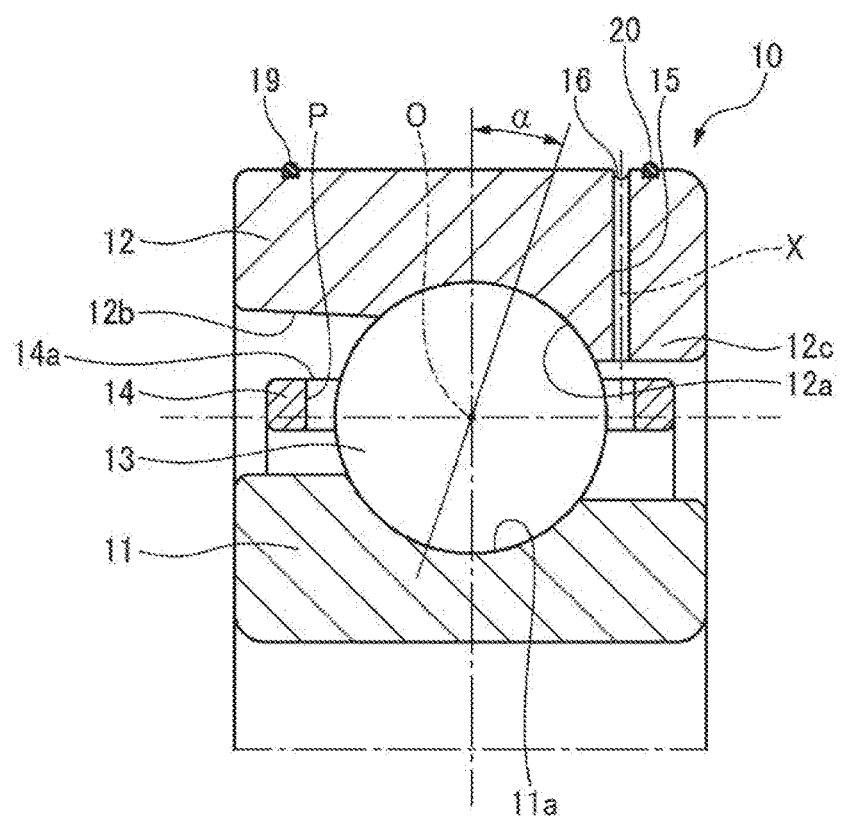
FIG. 2 is a sectional view depicting a ball bearing in accordance with a first modified embodiment of the first embodiment of the present invention.

In the meantime, like a first modified embodiment shown in FIG. 2, the outer peripheral surface of the outer ring 12 is formed with annular grooves 19 at both axial sides of the concave groove 16 being interposed therebetween along the circumferential direction, and a seal member 20, which is an annular elastic member such as an O-ring, is arranged in each of the annular grooves 19, so that it is possible to prevent the oil leakage.

Figure 3:
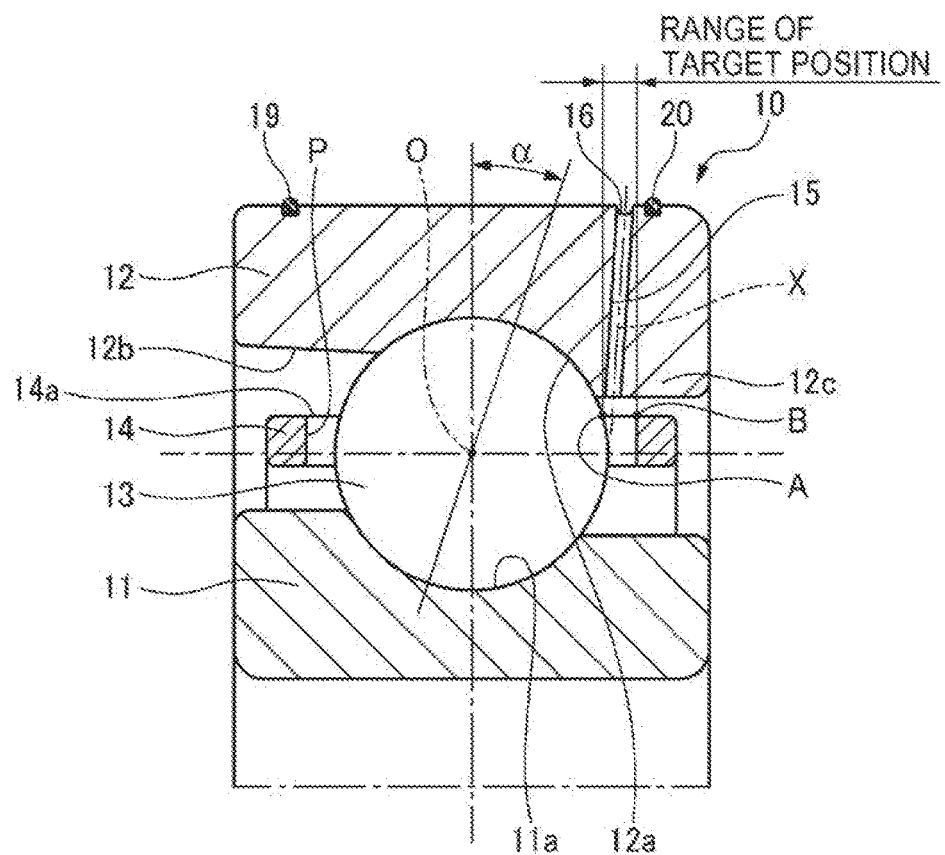
FIG. 3 is a sectional view depicting a ball bearing in accordance with a second modified embodiment of the first embodiment of the present invention.

Also, like a second modified embodiment shown in FIG. 3, the radial hole 15 may be inclined relative to the radial direction of the bearing. In the second modified embodiment, the radial hole 15 is inclined so that it is located at an axially more inner side from the outer-diameter side toward the inner-diameter side. Also in this case, the axial position of the extension line of the central line X of the radial hole 15 on the outer peripheral surface of the cage 14 is located between the intersection position A, at which the outer peripheral surface 14a of the cage 14 and the surface of the ball 13 intersect, and the axial end portion B of the pocket P, in the section taken along the axial direction passing through the center O of the ball 13, so that it is possible to achieve the effects of the first embodiment.

Meanwhile, also in the second modified embodiment shown in FIG. 3, the seal member may not be provided, like FIG. 1.

Second Embodiment

Subsequently, a ball bearing of a second embodiment is described with reference to FIG. 4.

In the second embodiment, the position of the radial hole is different from the first embodiment. Therefore, the parts, which are the same as or equivalent to the first embodiment, are denoted with the same reference numerals, and the descriptions thereof are omitted or simplified.

In a ball bearing 10a of the second embodiment, the radial hole 15 is located at the counterbore-side with respect to the outer ring raceway groove 12a, and at least a part of the inner diameter-side opening of the radial hole 15 is provided on the counterbore 12h formed in the inner peripheral surface of the outer ring 12.

Also in the second embodiment, the axial position of the extension line of the central line X of the radial hole 15 on the outer peripheral surface of the cage 14 is located within the range of the target position between the intersection position A, at which the outer peripheral surface 14a of the cage 14 and the surface of the ball 13 intersect, and the axial end portion B of the pocket P, in the section taken along the axial direction passing through the center O of the ball 13. Therefore, like the first embodiment, also in the ball bearing 10a of the second embodiment, it is possible to prevent a damage of the bearing due to poor lubrication and abnormal heat generation and to keep the stable rotation characteristics at high speed.

Figure 5:
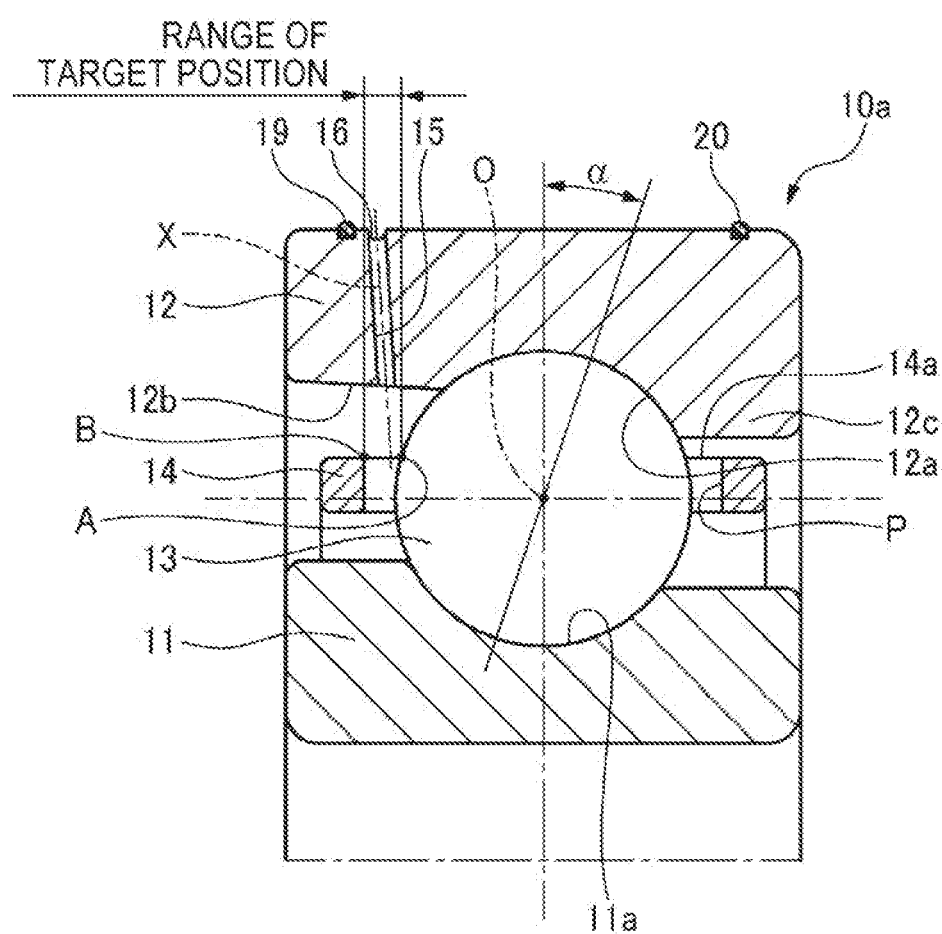
FIG. 5 is a sectional view depicting a ball bearing in accordance with a first modified embodiment of the second embodiment of the present invention.
Figure 6:
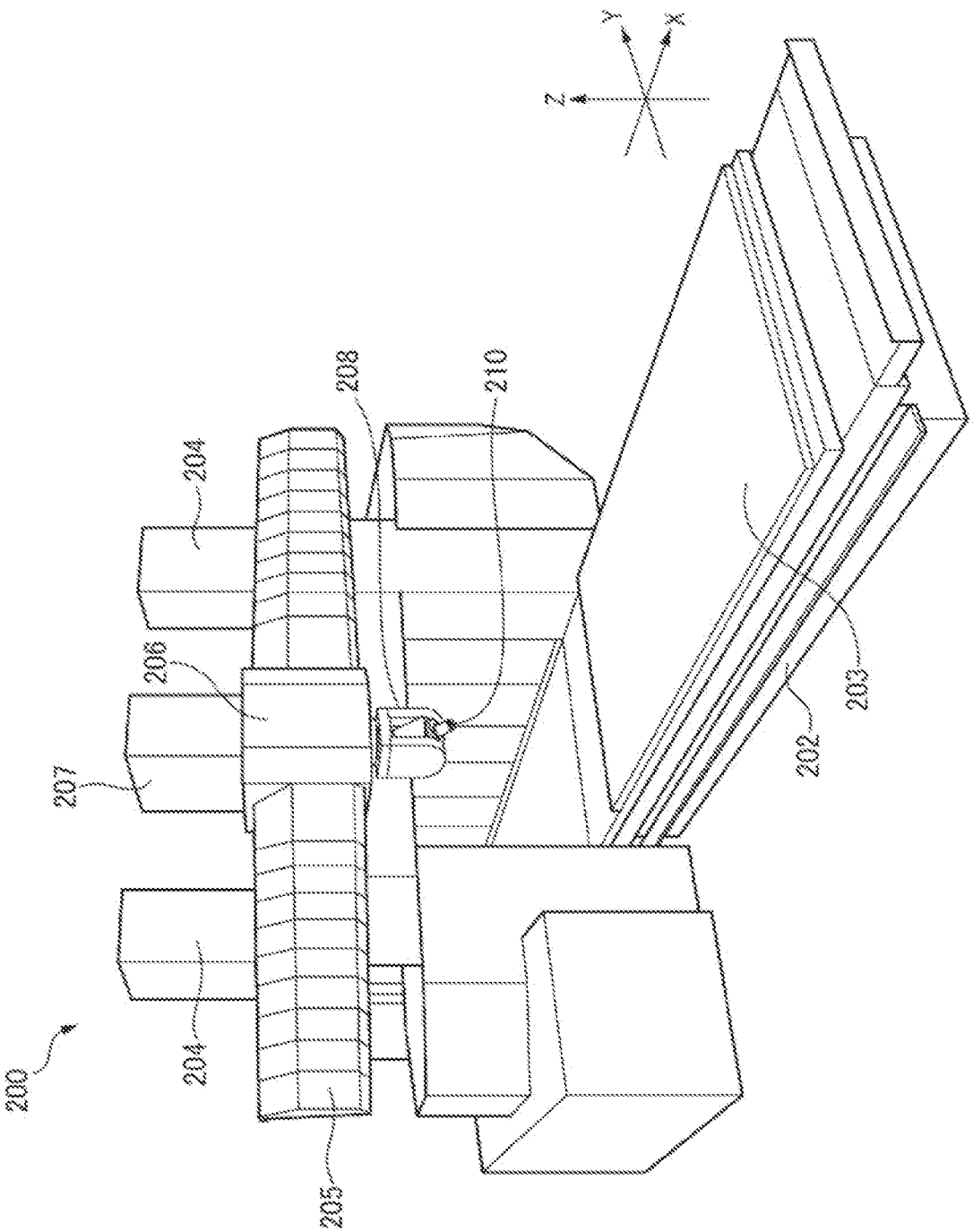
FIG. 6 is a schematic view of a double column type machining center to which a spindle for machine tool is to be applied.
Figure 7A:
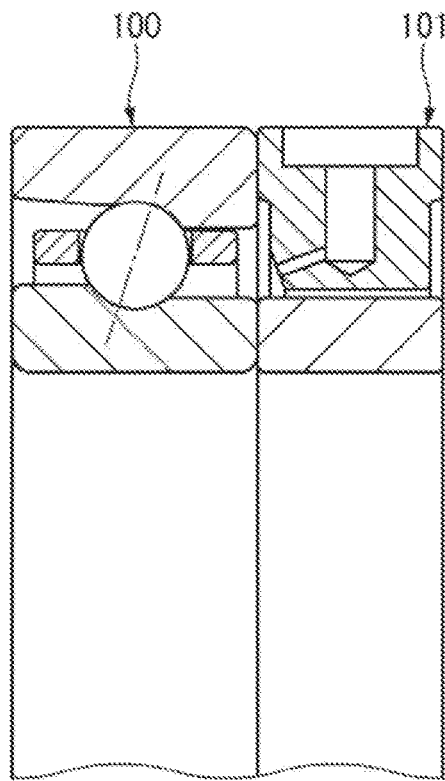
FIGS. 7A and 7B are sectional views depicting oil/air lubrication of the related art in which a nozzle piece is used.
Figure 7B:
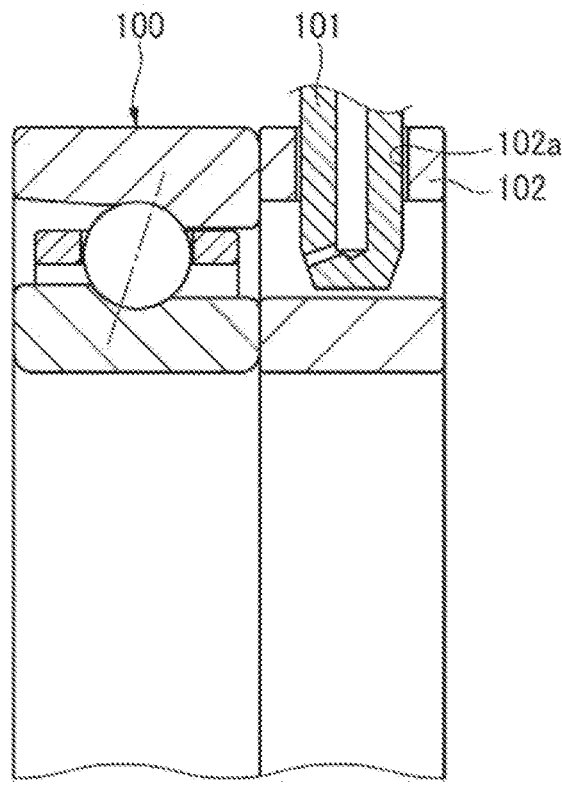
Figure 8:
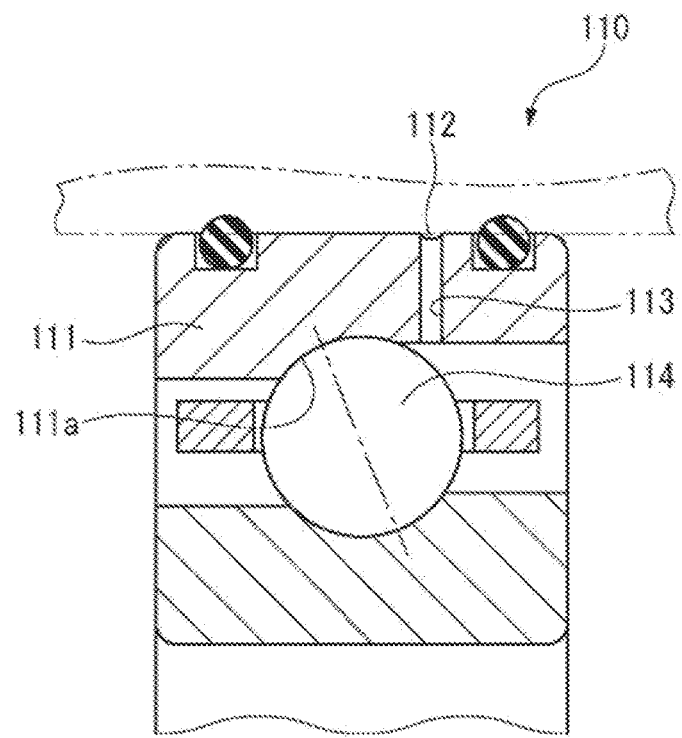
FIG. 8 is a sectional view of a ball bearing of oil/air lubrication of an outer ring oil supply specification.
Figure 9:
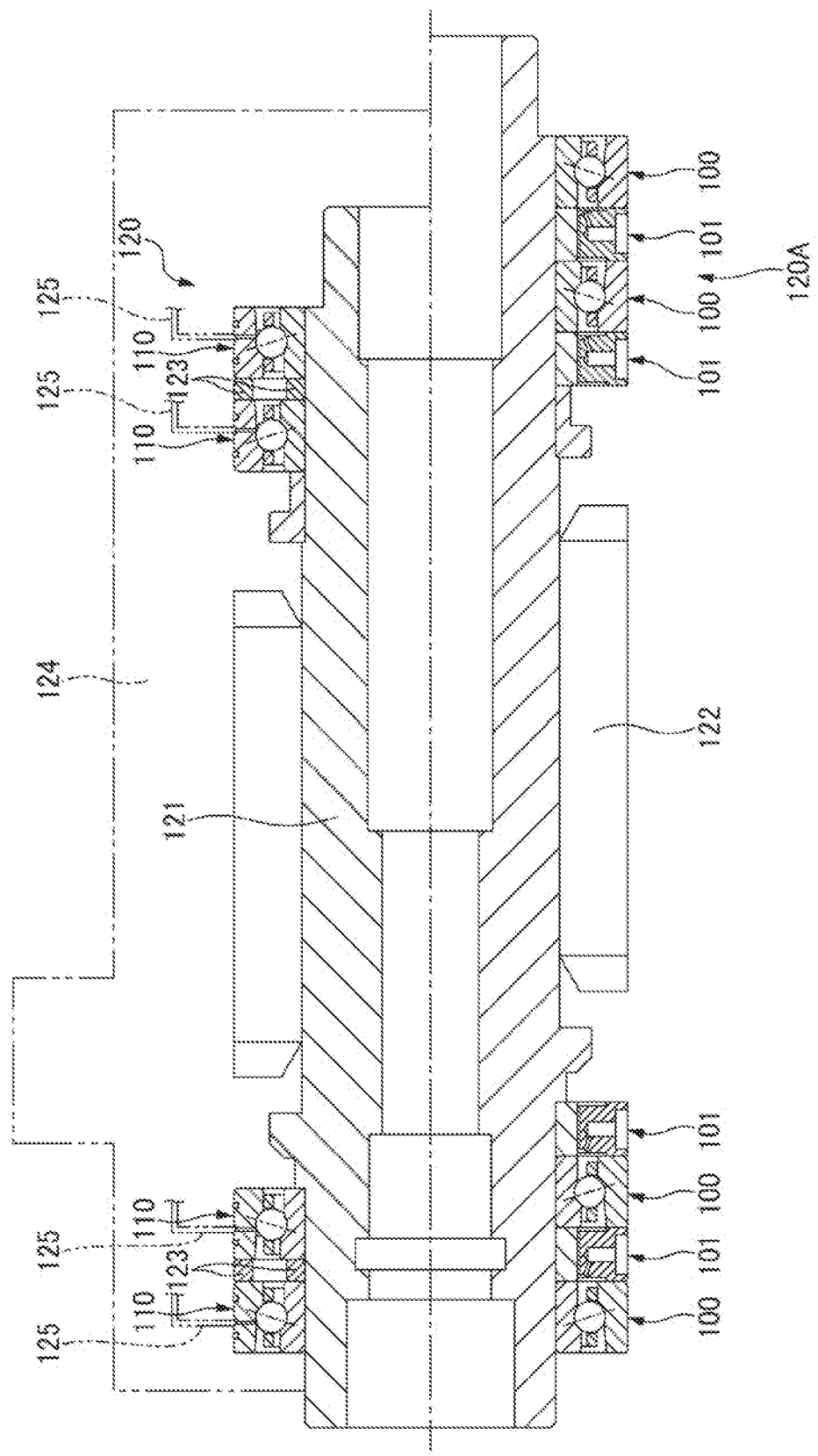
FIG. 9 is a sectional view depicting a spindle where oil/air lubrication of an outer ring oil supply specification is performed (upper half) and is a sectional view depicting a spindle where oil/air lubrication using a nozzle piece is performed (lower half).

Also in the second embodiment, like a modified embodiment shown in FIG. 5, the radial hole 15 may be inclined relative to the radial direction of the bearing. In this modified embodiment, the radial hole 15 is inclined so that it is located at an axially more inner side from the outer-diameter side toward the inner-diameter side. Also in this case, the axial position of the extension line of the central line X of the radial hole 15 on the outer peripheral surface of the cage 14 is located between the intersection position A, at which the outer peripheral surface 14a of the cage 14 and the surface of the ball 13 intersect, and the axial end portion B of the pocket P, in the section taken along the axial direction passing through the center O of the ball 13, so that it is possible to achieve the effects of the second embodiment.

Figure 4:
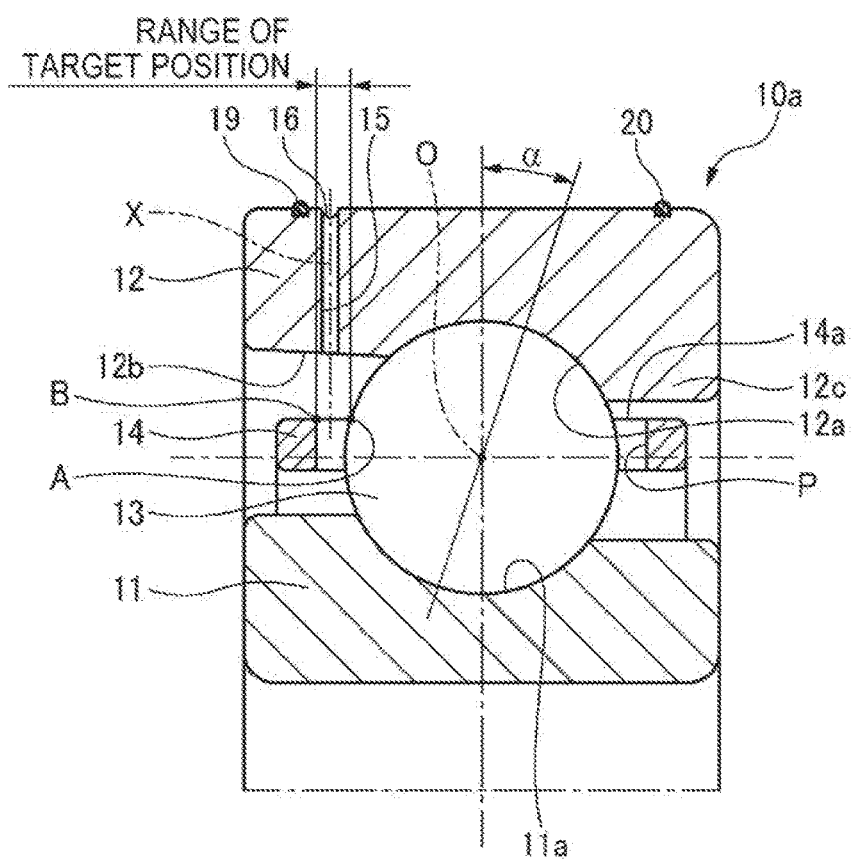
FIG. 4 is a sectional view depicting a ball bearing in accordance with a second embodiment of the present invention, together with a target position of a radial hole.

Meanwhile, in the second embodiment of FIG. 4 and the modified embodiment of FIG. 5, the seal members 20 are arranged on the outer peripheral surface of the outer ring 12. However, like FIG. 1, the seal member may not be provided, In the meantime, the present invention is not limited to the above embodiments, and can be appropriately modified and changed.

For example, in the above embodiments, the outer ring 12 has one radial hole. However, the present invention is not limited thereto. For example, the outer ring may have a plurality of radial holes.

In the meantime, as the method of supply the lubricating oil into the supply hole of the outer ring, oil/mist lubrication may be adopted, in addition to the oil/air lubrication. Oil/jet lubrication may also be adopted, depending on situations. However, in a grease supply method of supplying grease from the radial hole 15 of the outer ring 12 by using a lubricant supply device provided around the bearing or outside the spindle, if the radial hole 15 is formed to open toward an inside of the outer ring raceway groove 12a, the semisolid grease containing thickener is supplied into the outer ring raceway groove 12a.

In this case, since the grease is caught into the outer ring raceway groove 12a, the problems such as increase in torque and abnormal heat generation are generated due to stirring resistance. Particularly, the problems are more likely to be generated during the high-speed rotation, like the embodiments. Therefore, the oil lubrication method of supplying the lubricating oil, which does not contain the thickener, is preferable in the present invention.

Also, the ball bearing of the present invention is not limited to the spindle device for machine tool and can be applied as a ball bearing of a general industrial machine and a high-speed rotating device such as a motor, too.

The subject application is based on Japanese Patent Application No. 2016-159262 filed on Aug. 15, 2016, the contents of which are incorporated herein by reference.

DESCRIPTION OF REFERENCE NUMERALS

10: angular ball bearing (ball bearing)
11: inner ring
11a: inner ring raceway groove
12: outer ring
12a: outer ring raceway groove
12b: counterbore
12c: groove shoulder
13: ball
14: cage
15: radial hole
16: concave groove

The invention claimed is:

1. A ball bearing comprising:
an inner ring having an inner ring raceway groove formed in an outer peripheral surface;
an outer ring having an outer ring raceway groove formed in an inner peripheral surface;
a plurality of balls arranged rollably between the inner ring raceway groove and the outer ring raceway groove; and
a cage having pockets configured to keep therein the plurality of balls, wherein the outer ring has at least one radial hole which penetrates from an outer peripheral surface thereof to the inner peripheral surface thereof in a radial direction and which is configured to supply lubricating oil,
wherein the ball bearing is lubricated by the lubricating oil,
wherein an axial position of an extension line of a central line of the radial hole on an outer peripheral surface of the cage is located between an intersection position, at which the outer peripheral surface of the cage and a surface of the ball intersect, and an axial end portion of the pocket, in a section taken along an axial direction passing through a center of the ball, and
wherein an inner diameter-side opening of the radial hole is provided only on a counterbore formed on the inner peripheral surface of the outer ring.

2. The ball bearing according to claim 1,
wherein the pocket of the cage has a circular cylinder shape.

3. A spindle device for machine tool comprising the ball bearing according to claim 2.

4. The ball bearing according to claim 1,
wherein the outer peripheral surface of the outer ring is formed with a concave groove which is configured to communicate with the radial hole and which is formed along a circumferential direction.

5. The ball bearing according to claim 4,
wherein the outer peripheral surface of the outer ring is formed with annular grooves which are formed at both axial sides of the concave groove being interposed therebetween and which are formed along the circumferential direction, and
wherein an annular seal member is arranged in each of the annular grooves.

6. A spindle device for machine tool comprising the ball bearing according to claim 4.

7. A spindle device for machine tool comprising the ball bearing according to claim 5.

8. The ball bearing according to claim 1,
wherein a diameter of the radial hole is 0.5 to 1.5 mm.

9. A spindle device for machine tool comprising the ball bearing according to claim 8.

10. A spindle device for machine tool comprising the ball bearing according to claim 1.

* * * * *